(12) United States Patent
Moldavsky et al.

(10) Patent No.: US 6,933,846 B2
(45) Date of Patent: Aug. 23, 2005

(54) DISPLACEMENT SENSING SYSTEM

(75) Inventors: Mark Moldavsky, Petach Tikva (IL); Boris Zhevelev, Rishon Lezion (IL)

(73) Assignee: Visonic Ltd., Tel Aviv (IL)

( * ) Notice: Subject to any disclaimer, the term of this patent is extended or adjusted under 35 U.S.C. 154(b) by 0 days.

(21) Appl. No.: 10/257,501

(22) PCT Filed: Apr. 18, 2001

(86) PCT No.: PCT/IL01/00357

§ 371 (c)(1),
(2), (4) Date: Apr. 23, 2003

(87) PCT Pub. No.: WO01/79887

PCT Pub. Date: Oct. 25, 2001

(65) Prior Publication Data

US 2004/0124981 A1 Jul. 1, 2004

(30) Foreign Application Priority Data

Apr. 18, 2000 (IL) ................................. 135730

(51) Int. Cl.[7] ............................................. G08B 13/14
(52) U.S. Cl. ................... 340/568.1; 340/547; 340/551; 340/686.2; 340/686.6; 324/207.11
(58) Field of Search ............................ 340/568.1, 547, 340/551, 686.2, 686.6; 324/207.11–207.26

(56) References Cited

U.S. PATENT DOCUMENTS

| | | | |
|---|---|---|---|
| 3,579,222 A | 5/1971 | Freeman .................... 340/541 |
| 3,618,059 A | 11/1971 | Allen | |
| 3,760,402 A | * 9/1973 | Magerle et al. .......... 340/568.8 |
| 3,961,320 A | * 6/1976 | Erdmann et al. ........... 340/517 |
| 3,973,191 A | 8/1976 | Zabler .................... 324/207.16 |
| 3,997,835 A | * 12/1976 | Ando et al. ............. 324/207.26 |
| 4,123,749 A | 10/1978 | Hartmann et al. | |
| 4,160,972 A | * 7/1979 | La Mell et al. ............. 340/541 |
| 4,274,088 A | 6/1981 | Pierson et al. ........... 340/568.8 |
| 4,293,852 A | 10/1981 | Rogers .................... 340/568.1 |
| 4,359,717 A | 11/1982 | Huber et al. ................ 340/429 |
| 4,391,203 A | 7/1983 | Millar .......................... 109/25 |
| 4,458,241 A | 7/1984 | Frankenberg ................ 340/571 |
| 4,502,042 A | * 2/1985 | Wuhrl et al. ................ 340/561 |
| 4,510,622 A | 4/1985 | Mori et al. ............... 455/67.15 |
| 4,584,571 A | 4/1986 | Smit et al. | |
| 4,587,486 A | 5/1986 | Soyck ......................... 324/236 |
| 4,734,585 A | 3/1988 | Owers | |
| 4,857,892 A | 8/1989 | Riordan .................... 340/568.8 |
| 4,897,531 A | 1/1990 | Someya et al. ............. 235/440 |
| 4,971,409 A | 11/1990 | Yeh et al. ....................... 359/7 |
| 5,012,206 A | 4/1991 | Tigges .......................... 331/65 |
| 5,099,225 A | 3/1992 | Narlow et al. | |
| 5,103,234 A | 4/1992 | Watkins et al. | |
| 5,182,564 A | 1/1993 | Burkett et al. ................ 342/53 |
| 5,191,314 A | 3/1993 | Ackerman et al. .......... 340/542 |
| 5,202,692 A | 4/1993 | Huguenin et al. .......... 342/179 |
| 5,227,667 A | 7/1993 | Takinami et al. | |
| 5,237,307 A | 8/1993 | Gritton .................... 340/572.1 |
| 5,241,297 A | 8/1993 | Goodman ................ 340/568.8 |
| 5,264,733 A | 11/1993 | Tigges ......................... 307/116 |
| 5,475,367 A | * 12/1995 | Prevost .................... 340/568.8 |
| 5,519,317 A | 5/1996 | Guichard et al. ........... 324/236 |

(Continued)

FOREIGN PATENT DOCUMENTS

CA  1 254 282  5/1989

*Primary Examiner*—Benjamin C. Lee
(74) *Attorney, Agent, or Firm*—Welsh & Katz, Ltd.

(57) ABSTRACT

A displacement sensing system including an oscillator circuit having a characteristic frequency which varies as a function of a magnetic field in the vicinity thereof, an element whose position relative to the oscillator circuit is varied by a displacement, the element being operative to vary the magnetic field in the vicinity of the oscillator circuit as a function of the displacement and circuitry for sensing a change of frequency of the oscillator circuit over time (delta f/delta t) and for providing an output indication when the change in frequency of the oscillator circuit over time exceeds a threshold.

173 Claims, 9 Drawing Sheets

U.S. PATENT DOCUMENTS

| | | | |
|---|---|---|---|
| 5,530,247 A | 6/1996 | Mciver et al. | 250/336.1 |
| 5,552,778 A | 9/1996 | Schrott et al. | |
| 5,555,036 A | 9/1996 | Harnett et al. | 340/933 |
| 5,576,693 A | 11/1996 | Tyren et al. | |
| 5,656,998 A | 8/1997 | Fujiuchi et al. | 340/571 |
| 5,731,785 A | 3/1998 | Lemelson et al. | 342/357.07 |
| 5,760,577 A | 6/1998 | Shizuya | 324/207.16 |
| 5,764,145 A * | 6/1998 | Hansson et al. | 340/562 |
| 5,767,672 A | 6/1998 | Guichard et al. | 324/236 |
| 5,790,025 A | 8/1998 | Amer et al. | 340/571 |
| 5,815,113 A | 9/1998 | Lo et al. | 342/351 |
| 5,825,293 A * | 10/1998 | Ahmed et al. | 340/573.1 |
| 5,986,549 A | 11/1999 | Teodorescu | 340/561 |
| 6,250,601 B1 | 6/2001 | Kolar et al. | 251/129.04 |
| 6,400,269 B1 * | 6/2002 | Savastano | 340/568.1 |
| 6,424,261 B1 * | 7/2002 | Williams et al. | 340/568.8 |
| 6,686,841 B1 * | 2/2004 | Busch et al. | 340/571 |

* cited by examiner

DISPLACEMENT SENSING SYSTEM

FIELD OF THE INVENTION

The present invention relates to security systems and apparatus generally and more particularly to systems and apparatus for protecting against unauthorized displacement of objects.

BACKGROUND OF THE INVENTION

Various types of protective apparatus and systems are known in the prior art. The following U.S. Pat. Nos. are believed to represent the state of the art: 5,986,549; 5,767,672; 5,760,577; 5,731,785; 5,656,998; 5,519,317; 5,264,733; 5,241,297; 5,237,307; 5,191,314; 5,012,206; 4,897,531; 4,857,892; 4,587,486; 4,458,241; 4,391,203; 4,359,717; 4,274,088; 3,973,191; 3,579,222.

SUMMARY OF THE INVENTION

The present invention seeks to provide improved protective apparatus and systems, particularly suitable for protection of works of art and the like.

There is thus provided in accordance with a preferred embodiment of the present invention a displacement sensing system including an oscillator circuit having a characteristic frequency which varies as a function of a magnetic field in the vicinity thereof, an element whose position relative to the oscillator circuit is varied by a displacement to be sensed, the element being operative to vary the magnetic field in the vicinity of the oscillator circuit as a function of the displacement, and circuitry for sensing a change of frequency of the oscillator circuit over time ($\Delta f/\Delta t$) and for providing an output indication when the change in frequency of the oscillator circuit over time exceeds a threshold.

Further in accordance with a preferred embodiment of the present invention the circuitry for sensing a change of frequency over time provides at least first and second different output indications when the change in frequency of the oscillator circuit over time exceeds respective at least first and second different thresholds.

Further in accordance with a preferred embodiment of the present invention the threshold is variable. Preferably, the threshold varies as a function of a currently perceived threat.

Additionally the currently perceived threat may be determined by a pattern of past outputs of the circuitry for sensing a change of frequency.

Still further in accordance with a preferred embodiment of the present invention the oscillator circuit and the circuitry for sensing a change of frequency are operated in accordance with a duty cycle. Preferably, duty cycle is variable. Additionally or alternatively, the duty cycle is adaptive or the duty cycle may vary as a function of a currently perceived threat.

Additionally in accordance with a preferred embodiment of the present invention the currently perceived threat is determined by a pattern of past outputs of the circuitry for sensing a change of frequency.

Furthermore in accordance with a preferred embodiment of the present invention the threshold varies in accordance with long time scale changes in the characteristic frequency.

Further in accordance with a preferred embodiment of the present invention the threshold includes first and second frequency thresholds, respectively above and below the characteristic frequency and which are normally generally equally separated therefrom in the frequency domain.

Still further in accordance with a preferred embodiment of the present invention the displacement sensing system also includes wireless communication circuitry operative to transmit the output indication to a remote receiving location. Preferably, the wireless communication circuitry is operative to transmit the output indication for at least a predetermined time following sensing of the change in frequency.

Furthermore in accordance with a preferred embodiment of the present invention the displacement sensing system also includes a locator operative for sensing the location of at least one of the oscillator, the element and the circuitry for sensing.

Additionally in accordance with a preferred embodiment of the present invention the element is a magnet. Preferably the element is an electromagnet. Alternatively the element is a permanent magnet.

Further in accordance with a preferred embodiment of the present invention the circuitry for sensing a change of frequency includes a microprocessor which receives an output of the oscillator circuit as a clock input.

Furthermore in accordance with a preferred embodiment of the present invention the circuitry for sensing a change of frequency is operative to count oscillator pulses over variable time periods which represent variable sensitivity thresholds.

There is thus also provided in accordance with a preferred embodiment of the present invention a displacement sensing system including an oscillator circuit having a characteristic frequency which varies as a function of a magnetic field in the vicinity thereof, an element whose position relative to the oscillator circuit is varied by a displacement to be sensed, the element being operative to vary the magnetic field in the vicinity of the oscillator circuit as a function of the displacement, and circuitry for sensing a time duration over which a change of frequency of at least a given amount takes place and for providing an output indication when the time duration exceeds a threshold.

Further in accordance with a preferred embodiment of the present invention the circuitry for sensing a time duration provides at least first and second different output indications when the time duration exceeds respective at least first and second different thresholds. Preferably, the threshold is variable and varies as a function of a currently perceived threat.

Additionally in accordance with a preferred embodiment of the present invention the currently perceived threat is determined by a pattern of past outputs of the circuitry for sensing a change of frequency.

Still further in accordance with a preferred embodiment of the present invention the oscillator circuit and the circuitry for sensing a time duration are operated in accordance with a duty cycle. Preferably the duty cycle is variable and adaptive.

Preferably the duty cycle varies as a function of a currently perceived threat.

Still further in accordance with a preferred embodiment of the present invention the currently perceived threat is determined by a pattern of past outputs of the circuitry for sensing a change of frequency. Preferably the given amount remains generally constant notwithstanding long time scale changes in the characteristic frequency.

Additionally in accordance with a preferred embodiment of the present invention the displacement sensing system also includes wireless communication circuitry operative to transmit the output indication to a remote receiving location.

Preferably, the wireless communication circuitry is operative to transmit the output indication for at least a predetermined time following sensing of the change in frequency.

Further in accordance with a preferred embodiment of the present invention the displacement sensing system also includes a locator operative for sensing the location of at least one of the oscillator, the element and the circuitry for sensing.

Moreover in accordance with a preferred embodiment of the present invention the element is a magnet the element is an electromagnet. Alternatively the element is a permanent magnet.

Additionally in accordance with a preferred embodiment of the present invention the circuitry for sensing a time duration includes a microprocessor which receives an output of the oscillator circuit as a clock input.

Further in accordance with a preferred embodiment of the present invention the circuitry for sensing a time duration is operative to count oscillator pulses over variable time periods which represent variable sensitivity thresholds. Preferably the circuitry for sensing a time duration includes a microprocessor which provides the output indication.

There is thus further provided in accordance with yet another preferred embodiment of the present invention a displacement sensing system including an oscillator circuit having a characteristic frequency which varies as a function of a magnetic field in the vicinity thereof, an element whose position relative to the oscillator circuit is varied by a displacement to be sensed, the element being operative to vary the magnetic field in the vicinity of the oscillator circuit as a function of the displacement, circuitry for sensing a change of frequency of the oscillator circuit over time ($\Delta f/\Delta t$) and for providing an output indication when the change in frequency of the oscillator circuit over time exceeds a frequency threshold, and circuitry for sensing a time duration over which a change of frequency of at least a given amount takes place and for providing an output indication when the time duration exceeds a time threshold.

Further in accordance with a preferred embodiment of the present invention the circuitry for sensing a change of frequency over time provides at least first and second different output indications when the change in frequency of the oscillator circuit over time exceeds respective at least first and second different thresholds.

Still further in accordance with a preferred embodiment of the present invention the frequency threshold is variable. Preferably the frequency threshold varies as a function of a currently perceived threat. Additionally the currently perceived threat is determined by a pattern of past outputs of the circuitry for sensing a change of frequency.

Furthermore in accordance with a preferred embodiment of the present invention the frequency threshold varies in accordance with long time scale changes in the characteristic frequency. The frequency threshold includes first and second frequency thresholds, respectively above and below the characteristic frequency and which are normally generally equally separated therefrom in the frequency domain.

Additionally in accordance with a preferred embodiment of the present invention the time threshold is variable. Preferably the time threshold varies as a function of a currently perceived threat and wherein the currently perceived threat is determined by a pattern of past outputs of the circuitry for sensing a change of frequency.

Additionally in accordance with a preferred embodiment of the present invention the oscillator circuit and the circuitry for sensing a time duration are operated in accordance with a duty cycle. Preferably the duty cycle is variable and adaptive.

Additionally in accordance with a preferred embodiment of the present invention the duty cycle varies as a function of a currently perceived threat and wherein the currently perceived threat is determined by a pattern of past outputs of the circuitry for sensing a change of frequency.

Additionally in accordance with a preferred embodiment of the present invention the given amount remains generally constant notwithstanding long time scale changes in the characteristic frequency.

Still further in accordance with a preferred embodiment of the present invention the circuitry for sensing a time duration provides at least first and second different output indications when the time duration exceeds respective at least first and second different thresholds.

Further in accordance with a preferred embodiment of the present invention the displacement sensing system also includes wireless communication circuitry operative to transmit the output indication to a remote receiving location and is operative to transmit the output indication for at least a predetermined time following sensing of the change in frequency.

Additionally in accordance with a preferred embodiment of the present invention the displacement sensing system also includes a locator operative for sensing the location of at least one of the oscillator, the element and the circuitry for sensing.

Still further in accordance with a preferred embodiment of the present invention the element is a magnet. Alternatively the element may be an electromagnet or a permanent magnet.

Additionally in accordance with a preferred embodiment of the present invention the circuitry for sensing a time duration and the circuitry for sensing a change of frequency includes a microprocessor which receives an output of the oscillator circuit as a clock input.

Further in accordance with a preferred embodiment of the present invention the circuitry for sensing a time duration is operative to count oscillator pulses over variable time periods which represent variable sensitivity thresholds.

There is thus provided in accordance with a further embodiment of the present invention a protected object including an object having associated therewith a displacement sensing system. The displacement sensing unit includes an oscillator circuit having a characteristic frequency which varies as a function of a magnetic field in the vicinity thereof, an element whose position relative to the oscillator circuit is varied by a displacement to be sensed, the element being operative to vary the magnetic field in the vicinity of the oscillator circuit as a function of the displacement and circuitry for sensing a change of frequency of the oscillator circuit over time ($\Delta f/\Delta t$) and for providing an output indication when the change in frequency of the oscillator circuit over time exceeds a threshold, wherein one but not both of the oscillator circuit and the element is fixedly mounted onto the object.

Further in accordance with a preferred embodiment of the present invention the oscillator circuit is fixedly mounted onto the object.

Still further in accordance with a preferred embodiment of the present invention the element is fixedly mounted onto the object.

Additionally in accordance with a preferred embodiment of the present invention the threshold is variable. Preferably the threshold varies as a function of a currently perceived threat.

Moreover in accordance with a preferred embodiment of the present invention the currently perceived threat is determined by a pattern of past outputs of the circuitry for sensing a change of frequency.

Additionally in accordance with a preferred embodiment of the present invention the oscillator circuit and the circuitry for sensing a change of frequency are operated in accordance with a duty cycle. Preferably the duty cycle is variable or adaptive. The duty cycle may also vary as a function of a currently perceived threat.

Furthermore in accordance with a preferred embodiment of the present invention the currently perceived threat is determined by a pattern of past outputs of the circuitry for sensing a change of frequency.

Preferably the threshold varies in accordance with long time scale changes in the characteristic frequency. Additionally the threshold includes first and second frequency thresholds, respectively above and below the characteristic frequency and which are normally generally equally separated therefrom in the frequency domain.

Additionally in accordance with a preferred embodiment of the present invention the circuitry for sensing a change of frequency over time provides at least first and second different output indications when the change in frequency of the oscillator circuit over time exceeds respective at least first and second different thresholds.

Further in accordance with a preferred embodiment of the present invention the protected object also includes wireless communication circuitry operative to transmit the output indication to a remote receiving location.

Additionally in accordance with a preferred embodiment of the present invention the wireless communication circuitry is operative to transmit the output indication for at least a predetermined time following sensing of the change in frequency. Still further in accordance with a preferred embodiment of the present invention the element is a magnet. The element is an electromagnet or a permanent magnet.

Additionally in accordance with a preferred embodiment of the present invention the circuitry for sensing a change of frequency includes a microprocessor which receives an output of the oscillator circuit as a clock input.

Moreover in accordance with a preferred embodiment of the present invention the circuitry for sensing a change of frequency includes operative to count oscillator pulses over variable time periods which represent variable sensitivity thresholds.

Additionally in accordance with a preferred embodiment of the present invention the circuitry for sensing a change of frequency is a microprocessor which provides the output indication.

There is thus provided in accordance with another preferred embodiment of the present invention a protected object including an object having associated therewith a displacement sensing system. The displacement sensing system includes an oscillator circuit having a characteristic frequency which varies as a function of a magnetic field in the vicinity thereof, an element whose position relative to the oscillator circuit is varied by a displacement to be sensed, the element being operative to vary the magnetic field in the vicinity of the oscillator circuit as a function of the displacement, and circuitry for sensing a time duration over which a change of frequency of at least a given amount takes place and for providing an output indication when the time duration exceeds a threshold, wherein one but not both of the oscillator circuit and the element is fixedly mounted onto the object.

Further in accordance with a preferred embodiment of the present invention the circuitry for sensing a time duration provides at least first and second different output indications when the time duration exceeds respective at least first and second different thresholds.

Still further in accordance with a preferred embodiment of the present invention the oscillator circuit is fixedly mounted onto the object.

Additionally in accordance with a preferred embodiment of the present invention the element is fixedly mounted onto the object.

Moreover in accordance with a preferred embodiment of the present invention the threshold is variable. Preferably the threshold varies as a function of a currently perceived threat and wherein the currently perceived threat is determined by a pattern of past outputs of the circuitry for sensing a change of frequency.

Additionally in accordance with a preferred embodiment of the present invention the oscillator circuit and the circuitry for sensing a time duration are operated in accordance with a duty cycle. Preferably the duty cycle is variable or adaptive.

Furthermore in accordance with a preferred embodiment of the present invention the duty cycle varies as a function of a currently perceived threat.

Additionally in accordance with a preferred embodiment of the present invention the currently perceived threat is determined by a pattern of past outputs of the circuitry for sensing a change of frequency.

Further in accordance with a preferred embodiment of the present invention the given amount remains generally constant notwithstanding long time scale changes in the characteristic frequency.

Still further in accordance with a preferred embodiment of the present invention the circuitry for sensing a time duration provides at least first and second different output indications when the time duration exceeds respective at least first and second different thresholds.

Additionally in accordance with a preferred embodiment of the present invention the protected object also includes wireless communication circuitry operative to transmit the output indication to a remote receiving location and is operative to transmit the output indication for at least a predetermined time following sensing of the change in frequency.

Moreover in accordance with a preferred embodiment of the present invention the element is a magnet. The element may be an electromagnet or a permanent magnet.

Furthermore in accordance with a preferred embodiment of the present invention the circuitry for sensing a change of frequency includes a microprocessor which receives an output of the oscillator circuit as a clock input.

Further in accordance with a preferred embodiment of the present invention the circuitry for sensing a change of frequency is operative to count oscillator pulses over variable time periods which represent variable sensitivity thresholds.

There is also provided in accordance with yet another preferred embodiment of the present invention a protected object including an object having associated therewith a displacement sensing system. The displacement sensing system includes an oscillator circuit having a characteristic frequency which varies as a function of a magnetic field in the vicinity thereof, an element whose position relative to the oscillator circuit is varied by a displacement to be sensed, the element being operative to vary the magnetic field in the vicinity of the oscillator circuit as a function of the displacement, circuitry for sensing a change of frequency of the oscillator circuit over time ($\Delta f/\Delta t$) and for providing an output indication when the change in frequency of the oscillator circuit over time exceeds a frequency threshold, and circuitry for sensing a time duration over which a change of frequency of at least a given amount takes place and for providing an output indication when the time duration exceeds a time threshold, wherein one but not both of the oscillator circuit and the element is fixedly mounted onto the object.

Further in accordance with a preferred embodiment of the present invention the oscillator circuit is fixedly mounted onto the object.

Still further in accordance with a preferred embodiment of the present invention the element is fixedly mounted onto the object.

Additionally in accordance with a preferred embodiment of the present invention the frequency threshold is variable. Preferably the frequency threshold varies as a function of a currently perceived threat and wherein the currently perceived threat is determined by a pattern of past outputs of the circuitry for sensing a change of frequency.

Further in accordance with a preferred embodiment of the present invention the oscillator circuit and the circuitry for sensing a change of frequency are operated in accordance with a duty cycle.

Still further in accordance with a preferred embodiment of the present invention the duty cycle is variable and adaptive.

Further in accordance with a preferred embodiment of the present invention the duty cycle varies as a function of a currently perceived threat and wherein the currently perceived threat is determined by a pattern of past outputs of the circuitry for sensing a change of frequency.

Moreover in accordance with a preferred embodiment of the present invention the frequency threshold varies in accordance with long time scale changes in the characteristic frequency. Preferably the frequency threshold includes first and second frequency thresholds, respectively above and below the characteristic frequency and which are normally generally equally separated therefrom in the frequency domain.

Further in accordance with a preferred embodiment of the present invention the circuitry for sensing a change of frequency over time provides at least first and second different output indications when the change in frequency of the oscillator circuit over time exceeds respective at least first and second different thresholds.

Still further in accordance with a preferred embodiment of the present invention the time threshold is variable and may vary as a function of a currently perceived threat. Preferably the currently perceived threat is determined by a pattern of past outputs of the circuitry for sensing a change of frequency.

Further in accordance with a preferred embodiment of the present invention the oscillator circuit and the circuitry for sensing a time duration are operated in accordance with a duty cycle. The duty cycle is variable and adaptive. The duty cycle may also vary as a function of a currently perceived threat.

Still further in accordance with a preferred embodiment of the present invention the currently perceived threat is determined by a pattern of past outputs of the circuitry for sensing a change of frequency.

Additionally in accordance with a preferred embodiment of the present invention the given amount remains generally constant notwithstanding long time scale changes in the characteristic frequency.

Moreover in accordance with a preferred embodiment of the present invention the circuitry for sensing a time duration provides at least first and second different output indications when the time duration exceeds respective at least first and second different thresholds.

Furthermore in accordance with a preferred embodiment of the present invention the element is a magnet. The element may be an electromagnet or a permanent magnet.

Further in accordance with a preferred embodiment of the present invention the circuitry for sensing a change of frequency is a microprocessor which receives an output of the oscillator circuit as a clock input.

Still further in accordance with a preferred embodiment of the present invention the circuitry for sensing a change of frequency is operative to count oscillator pulses over variable time periods which represent variable sensitivity thresholds.

Additionally in accordance with a preferred embodiment of the present invention the circuitry for sensing a change of frequency is a microprocessor which provides the output indication.

Preferably the protected object is an art object. The art object may be a painting and wherein one but not both of the oscillator circuit and the element is fixedly mounted onto a frame of the painting.

Further in accordance with a preferred embodiment of the present invention the art object may be a painting and wherein one but not both of the oscillator circuit and the element is fixedly mounted onto a canvas of the painting.

Still further in accordance with a preferred embodiment of the present invention the protected object also includes wireless communication circuitry operative to transmit the output indication to a remote receiving location. Preferably the wireless communication circuitry is operative to transmit the output indication for at least a predetermined time following sensing of the change in frequency.

Further in accordance with a preferred embodiment of the present invention the displacement is a vibrational displacement.

Additionally in accordance with a preferred embodiment of the present invention the oscillator circuit and the element are physically attached to each other. Alternatively the oscillator circuit and the element are not physically attached to each other.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
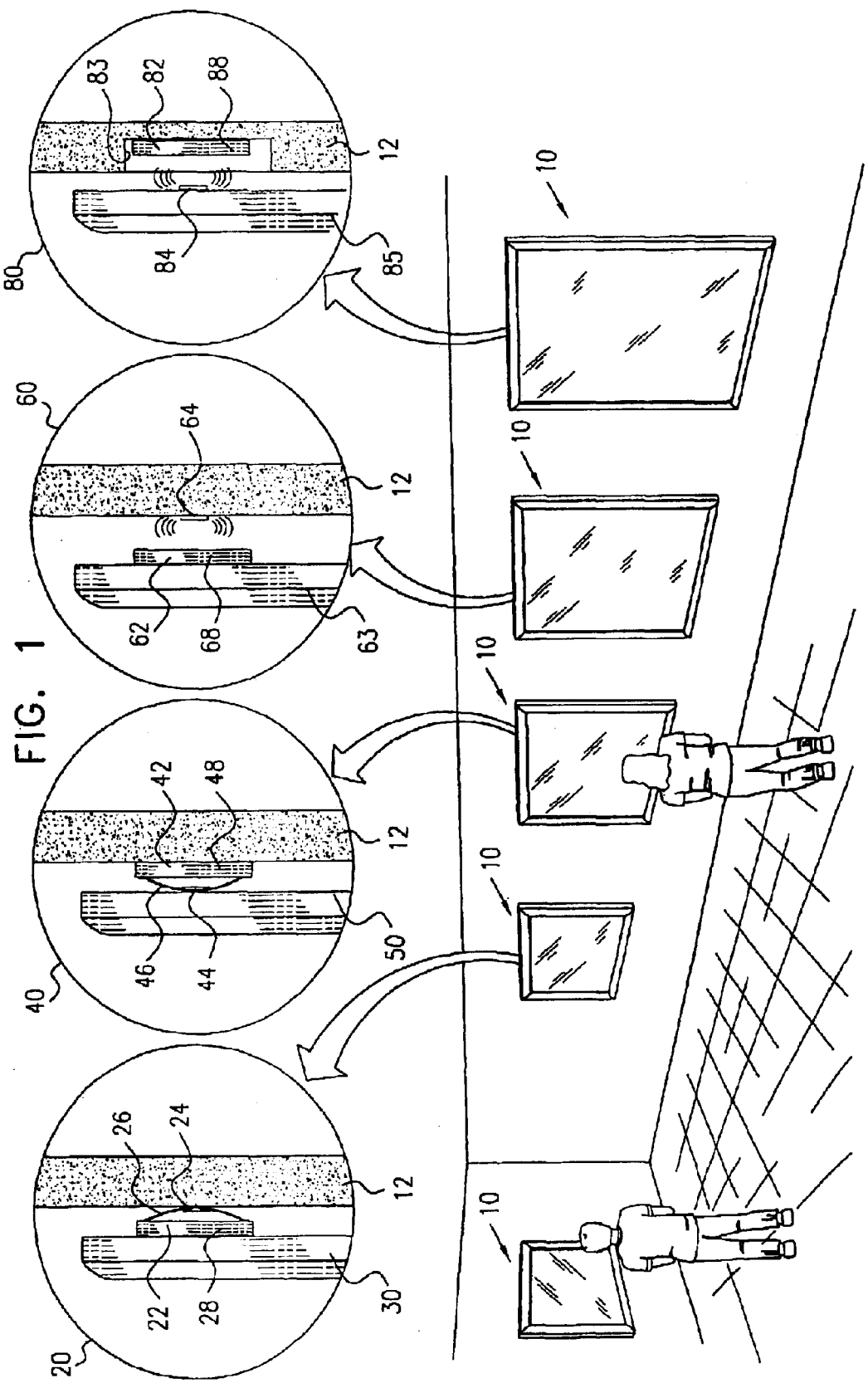
FIG. 1 is a simplified pictorial illustration of displacement sensing systems used in conjunction with protected objects in accordance with a preferred embodiment of the present invention.

Reference is now made to FIG. 1, which is a simplified pictorial illustration of displacement sensing systems used in conjunction with protected objects in accordance with a preferred embodiment of the present invention. FIG. 1 illustrates a typical picture gallery, such as in a museum, wherein various displacement sensing devices are associated with pictures 10 mounted on a wall 12. For the purposes of illustration, four different types of displacement sensing devices, constructed and operative in accordance with a preferred embodiment of the present invention, are shown, it being appreciated that a single type may be employed for all the pictures in a gallery or alternatively multiple types may be employed in accordance with the specific applications.

A first arrangement of displacement sensing device is indicated at reference numeral 20 and preferably includes an oscillator circuit, indicated generally by reference numeral 22 and having a characteristic frequency which varies as a function of a magnetic field in the vicinity thereof. An element 24, preferably a permanent magnet, is non-fixedly mounted relative to the oscillator circuit 22, typically on a spring 26.

The spring mounting of the element 24 relative to the oscillator circuit 22 is such that the position of the element 24 relative to the oscillator circuit 22 varies by a displacement to be sensed. The change in the relative positions of the element 24 and the oscillator 22 is operative to vary the magnetic field in the vicinity of the oscillator circuit as a function of the displacement. Circuitry 28 is also provided for sensing a change of frequency of the oscillator circuit over time ($\Delta f/\Delta t$) and for providing an output indication when the change in frequency of the oscillator circuit over time exceeds a threshold.

In the arrangement illustrated at reference numeral 20, the entire displacement sensing device described hereinabove is mounted onto a picture 30 and the displacement sensing device preferably is operative to provide an output indication of touching, moving, or removal of the picture 30 from wall 12.

A second arrangement of displacement sensing device is indicated at reference numeral 40 and preferably includes an oscillator circuit, indicated generally by reference numeral 42 and having a characteristic frequency which varies as a function of a magnetic field in the vicinity thereof. An element 44, preferably a permanent magnet is non-fixedly mounted relative to the oscillator circuit 42, typically on a spring 46.

The spring mounting of the element 44 relative to the oscillator circuit 42 is such that the position of the element 44 relative to the oscillator circuit 42 varies by a displacement to be sensed. The change in the relative positions of the element 44 and the oscillator 42 is operative to vary the magnetic field in the vicinity of the oscillator circuit as a function of the displacement. Circuitry 48 is also provided for sensing a change of frequency of the oscillator circuit over time ($\Delta f/\Delta t$) and for providing an output indication when the change in frequency of the oscillator circuit over time exceeds a threshold.

In the arrangement illustrated at reference numeral 40, the entire displacement sensing device described hereinabove is mounted onto a wall 12 behind and preferably touching a picture 50. The displacement sensing device preferably is operative to provide an output indication of touching, moving, or removal of the picture 50 from wall 12.

A third arrangement of displacement sensing device is indicated at reference numeral 60 and preferably includes an oscillator circuit, indicated generally by reference numeral 62 and having a characteristic frequency which varies as a function of a magnetic field in the vicinity thereof. The oscillator circuit 62 is preferably mounted onto the back of a picture 63. An element 64, preferably a permanent magnet, is fixedly mounted onto wall 12, in close spatial relationship to the oscillator circuit 62.

The mounting of the element 64 relative to the oscillator circuit 62 is such that the position of the element 64 relative to the oscillator circuit 62 varies by a displacement to be sensed. The change in the relative positions of the element 64 and the oscillator 62 is operative to vary the magnetic field in the vicinity of the oscillator circuit as a function of the displacement. Circuitry 68, typically also mounted on the back of picture 63, is provided for sensing a change of frequency of the oscillator circuit over time ($\Delta f/\Delta t$) and for providing an output indication when the change in frequency of the oscillator circuit over time exceeds a threshold.

In the arrangement illustrated at reference numeral 60, the displacement sensing device described hereinabove is bifurcated, with the oscillating circuit 62 mounted onto picture 63 and the element 64 being mounted onto wall 12. As in the embodiments described hereinabove, the displacement sensing device preferably is operative to provide an output indication of touching, moving, or removal of the picture 63 from wall 12.

A fourth arrangement of displacement sensing device is indicated at reference numeral 80 and preferably includes an oscillator circuit, indicated generally by reference numeral 82 and having a characteristic frequency which varies as a function of a magnetic field in the vicinity thereof. The oscillator circuit 82 is preferably mounted onto wall 12, typically in a recess 83. An element 84, preferably a permanent magnet, is fixedly mounted onto the back of a picture 85, in close spatial relationship to the oscillator circuit 82.

The mounting of the element 84 relative to the oscillator circuit 82 is such that the position of the element 84 relative to the oscillator circuit 82 varies by a displacement to be sensed. The change in the relative positions of the element 84 and the oscillator 82 is operative to vary the magnetic field in the vicinity of the oscillator circuit as a function of the displacement. Circuitry 88, typically mounted in recess 83, is provided for sensing a change of frequency of the oscillator circuit over time ($\Delta f/\Delta t$) and for providing an output indication when the change in frequency of the oscillator circuit over time exceeds a threshold.

In the arrangement illustrated at reference numeral 80, the displacement sensing device described hereinabove is bifurcated, with the oscillating circuit 82 mounted onto wall 12 and the element 84 being mounted onto picture 85. As in the embodiments described hereinabove, the displacement sensing device preferably is operative to provide an output indication of touching, moving, or removal of the picture 85 from wall 12.

Figure 2:
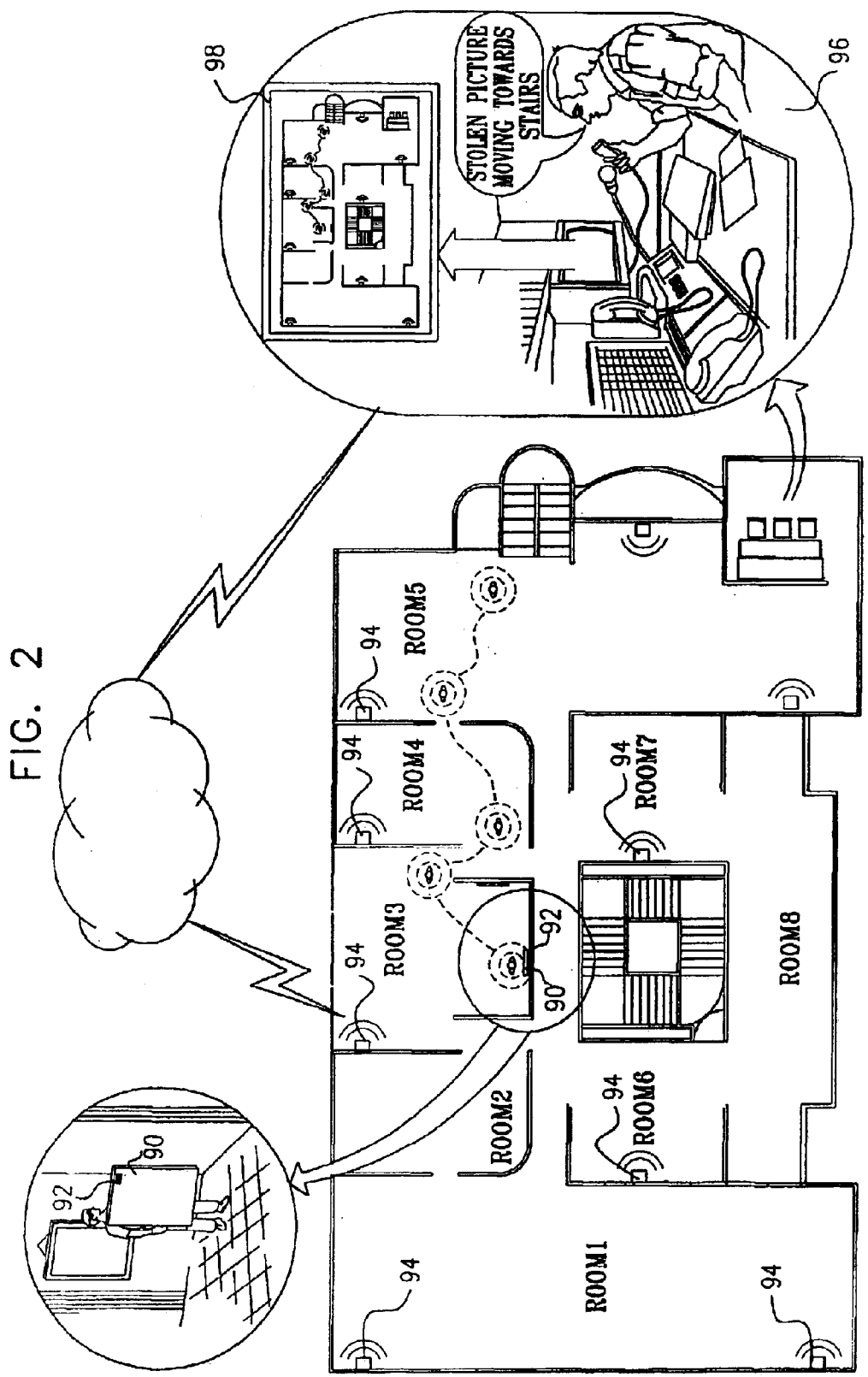
FIG. 2 is a simplified pictorial illustration of the operation of a location functionality in the environment of FIG. 1.

Reference is now made to FIG. 2, which is a simplified pictorial illustration of the operation of a removed picture location functionality in the environment of FIG. 1. In accordance with a preferred embodiment of the present invention, once an output indication of touching, moving or removal of a picture 90 is provided, a tracking functionality is provided.

In this embodiment of the invention, preferably when at least a part of the displacement sensing device is mounted on picture 90, such as in the arrangements indicated by reference numerals 20, 60 and 80, a transmitter 92 fixed to the picture 90, preferably associated with the displacement sensing device, provides a wireless output indication, typically via multiple receivers 94 distributed throughout the gallery, to a control unit 96. Preferably, control unit 96 includes a display 98 which shows the path and current position of a picture in respect of which tracking functionality has been initiated.

The tracking functionality itself may be entirely conventional, such as described in U.S. Pat. No. 5,731,785, the disclosure of which is hereby incorporated by reference.

Figure 3A:
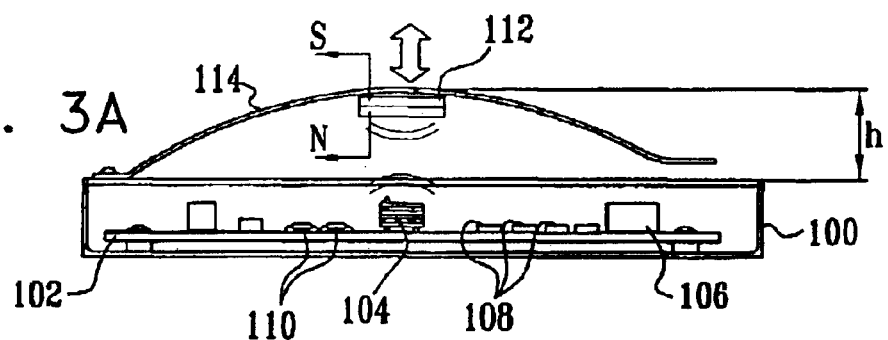
FIGS. 3A, 3B and 3C are simplified sectional illustrations of a displacement sensing assembly in three different operative orientations.
Figure 3B:
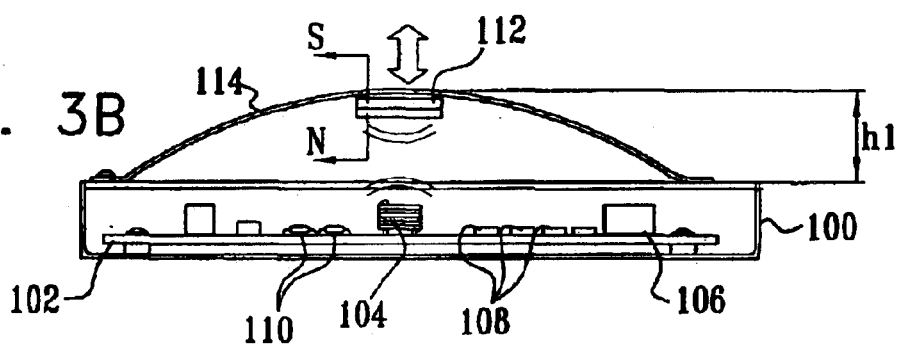
Figure 3C:
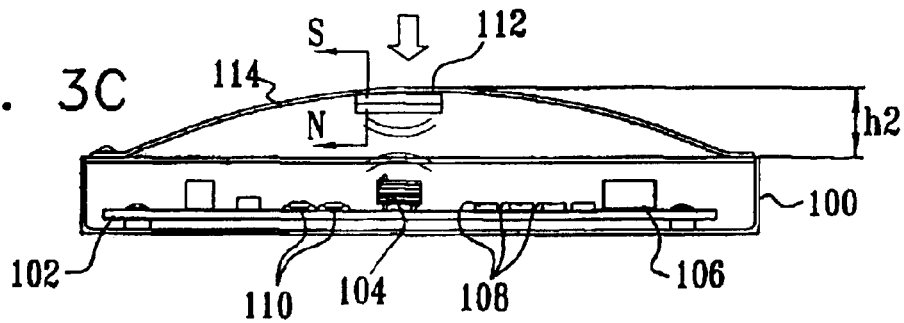

Reference is now made to FIGS. 3A, 3B and 3C, which are simplified illustrations of a displacement sensing system constructed and operative in accordance with a preferred embodiment of the present invention in three operative orientations.

As seen in FIGS. 3A, 3B and 3C, in this embodiment, which corresponds to the embodiments 20 and 40, there is provided a displacement sensing assembly including a housing 100, typically formed of plastic, inside of which is preferably mounted a printed circuit board 102. Mounted on printed circuit board 102 is an oscillator coil 104 and a battery 106, as well as additional circuitry 108 which senses a change of frequency of said oscillator circuit over time (Δf/Δt) and provides an output indication when the change in frequency of said oscillator circuit over time exceeds a threshold. Additionally mounted on printed circuit board 102 there is preferably also provided RF transmitter circuitry 110.

A permanent magnet 112 is preferably mounted onto a spring 114, which in turn is mounted onto the outside of housing 100.

FIG. 3A shows a situation wherein the spring 114 is at rest, while FIG. 3B shows a situation wherein the spring 114 is somewhat compressed, as in a typical situation, such as that illustrated at reference numeral 20 in FIG. 1. FIG. 3C shows a situation where the spring 114 is further compressed, as might occur momentarily when a picture with which the displacement sensing assembly 100 is associated, is touched. It is appreciated that a transition between the orientation shown in FIG. 3B and those of either FIGS. 3A and 3C normally causes an output indication of displacement to be transmitted by the displacement sensing assembly.

Figure 4:
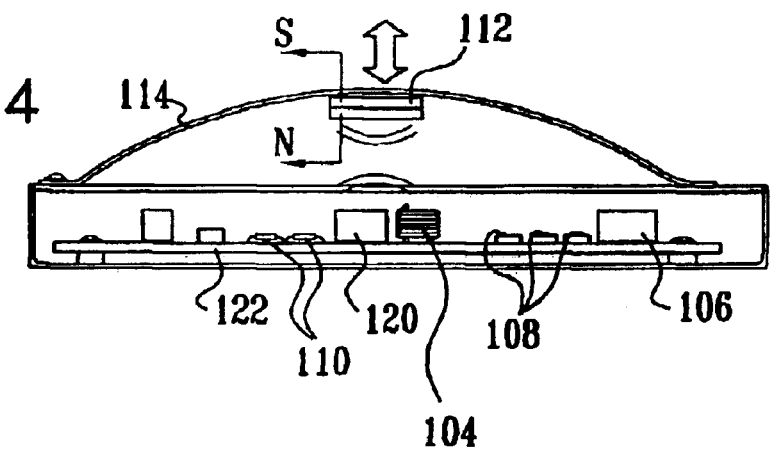
FIG. 4 is a simplified sectional illustration of an alternative embodiment of a displacement sensing assembly.
Figure 5:
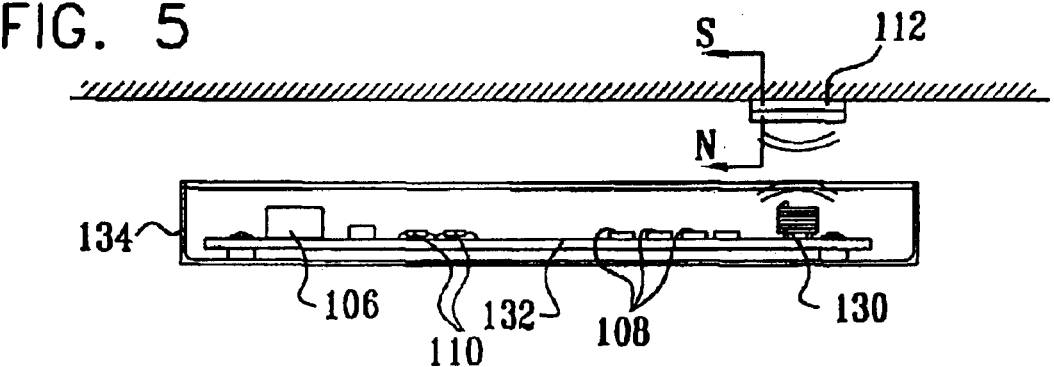
FIG. 5 is a simplified sectional illustration of another alternative embodiment of a displacement sensing assembly.

FIG. 4 illustrates an alternative embodiment of the displacement sensing assembly shown in FIGS. 3A–3C. In this embodiment, an additional magnet 120, preferably a permanent magnet but possibly an electromagnet, is provided on a circuit board 122. Otherwise, the embodiment of FIG. 4 may be identical to that of FIGS. 3A–3C. The provision of magnet 120 is operative to enhance the sensitivity of the displacement sensing assembly, by maximizing the change in inductivity of the coil 104 as a function of the change in magnetic field in the vicinity of the coil. FIG. 5 illustrates a further alternative embodiment of the displacement sensing assembly shown in FIGS. 3A–3C. In this embodiment, which corresponds to the embodiments indicated by reference numerals 60 and 80 in FIG. 1, no spring is provided. Additionally, in this embodiment, an oscillator coil 130 may be located at any suitable location on a circuit board 132 within a housing 134 and need not be at the center thereof. Otherwise, the embodiment of FIG. 5 may be identical to that of FIGS. 3A–3C.

Figure 6A:
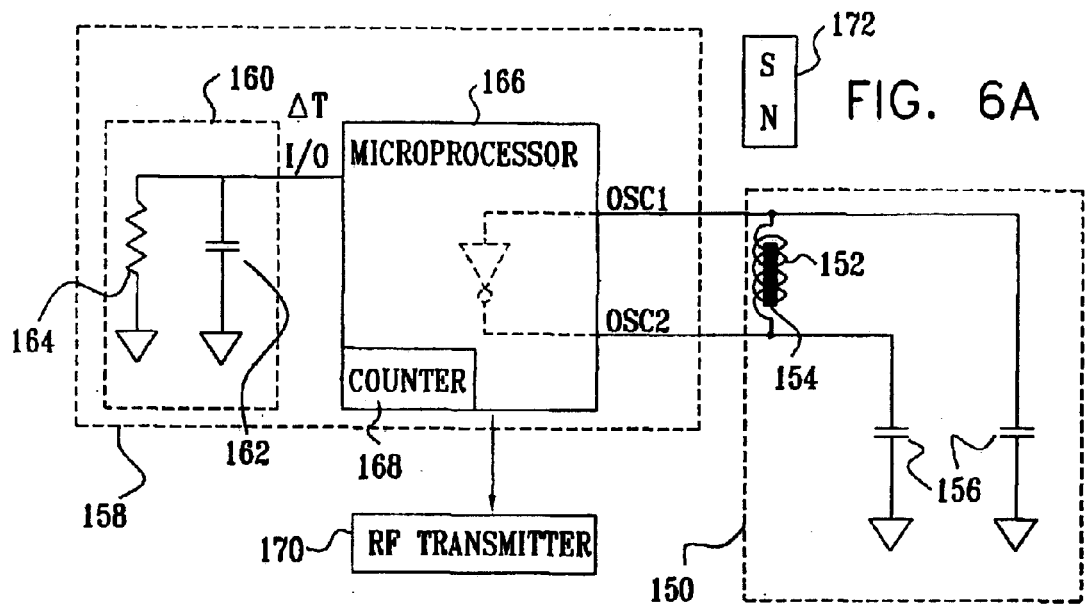
FIGS. 6A and 6B are simplified illustrations of two alternative embodiments of circuitry employed in displacement sensing systems constructed and operative in accordance with a preferred embodiment of the present invention.
Figure 6B:
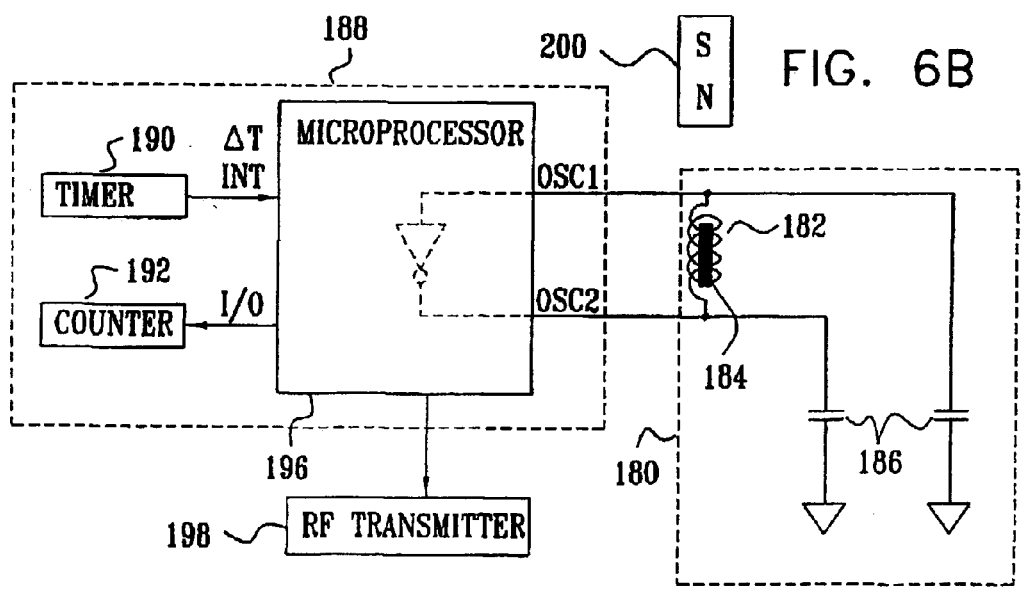

Reference is now made to FIGS. 6A and 6B, which are simplified illustrations of two alternative embodiments of circuitry employed in displacement sensing systems constructed and operative in accordance with a preferred embodiment of the present invention. Turning to FIG. 6A, it is seen that an oscillating circuit 150 includes a coil 152 preferably having a core 154. The coil 152 preferably is coupled to ground at both ends thereof via respective capacitors 156.

Circuitry 158 includes a RC combination 160, including a capacitor 162 and a resistor 164, which defines a time base ΔT. Circuitry 158 also includes a microprocessor 166, incorporating a counter 168, which receives the time base ΔT from RC combination 160 and receives at clock inputs thereof, oscillator outputs from oscillating circuit 150. Counter 168 counts pulses in the oscillator output. Microprocessor 166 preferably outputs to a conventional RF transmitter 170.

A magnet 172, such as the magnets described hereinabove which are displaceable relative to coils for varying the magnetic field in the vicinity thereof, is located in the vicinity of coil 152, such that displacement thereof causes a change in the frequency of the oscillator 150 output to microprocessor 166. In response to such changes, the microprocessor 166 may provide an alarm output indication via RF transmitter 170.

Turning to FIG. 6B, it is seen that an oscillating circuit 180 includes a coil 182 preferably having a core 184. The coil 182 preferably is coupled to ground at both ends thereof via respective capacitors 186.

Circuitry 188 includes a timer 190 and a counter 192, which are coupled to a microprocessor 196, which receives at clock inputs thereof, oscillator outputs from oscillating circuit 180. Counter 192 counts pulses in the oscillator output. Microprocessor 196 preferably outputs to a conventional RF transmitter 198.

A magnet 200, such as the magnets described hereinabove which are displaceable relative to coils for varying the magnetic field in the vicinity thereof, is located in the vicinity of coil 182, such that displacement thereof causes a change in the frequency of the oscillator outputs to microprocessor 196. In response to such changes, the microprocessor 196 may provide an alarm output indication via RF transmitter 198.

It is appreciated that various additional functionalities of microprocessors 166 and 196 may be provided. Some of these functionalities are described in Israel Patent Application 134,026 filed Jan. 13, 2000, entitled "Circuitry for Signal Measurement", the disclosure of which is hereby incorporated by reference.

Figure 7:
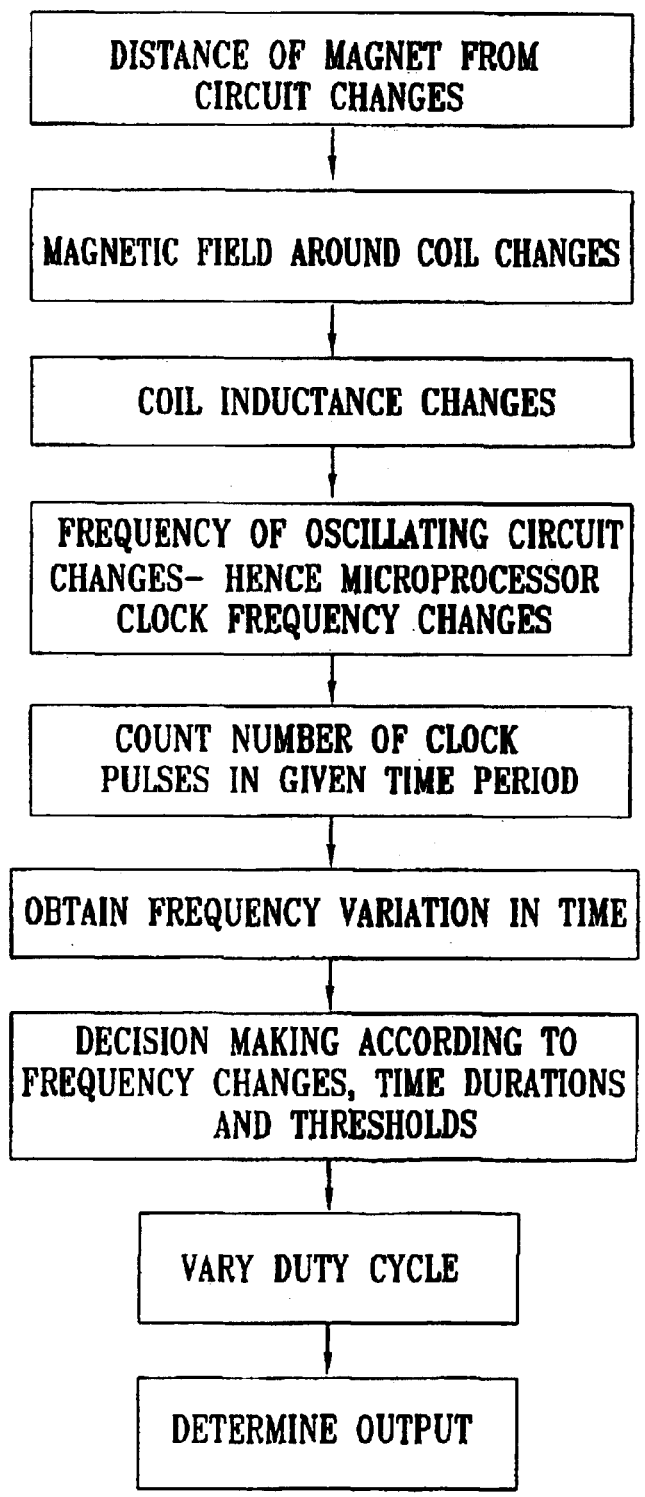
FIG. 7 is a simplified flowchart illustrating the operation of the sensing systems of FIGS. 6A and 6B.

Reference is now made to FIG. 7, which is a simplified flow chart illustrating operation of the circuitry of FIGS. 6A and 6B. As described hereinabove, in response to touching, moving or removing a picture or other objects from its intended location, the displacement sensing assembly causes the distance between the magnet and the oscillator coil to change. This causes the magnetic field in the vicinity of the coil to change and results in a corresponding change in the inductance of the coil.

Figure 8A:
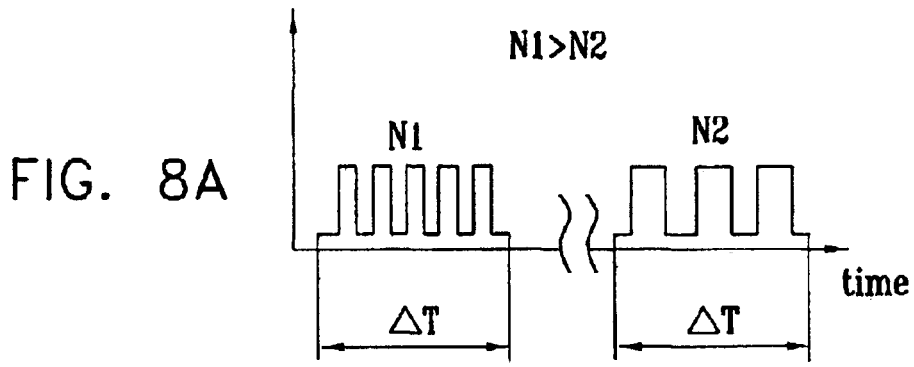
FIGS. 8A–8F are illustrations useful in understanding the operation of the embodiments of FIGS. 6A and 6B, respectively.

The change in the inductance of the coil causes a corresponding change in the frequency of the oscillating circuit, which is supplied as a clock frequency to the microprocessor. The number of clock pulses in a given time period are counted by the microprocessor. Two different pulse counts N1 and N2 taken at different times over an identical time duration are illustrated graphically in FIG. 8A.

Such counts over multiple time periods $\Delta T$ produce an indication of the frequency variation over time. Decisions as to whether and when an alarm indication is output depend on the nature of the changes in frequency, including inter alia, their time duration. Thresholds for alarm indications may change dynamically depending, inter alia on past history.

Figure 8B:
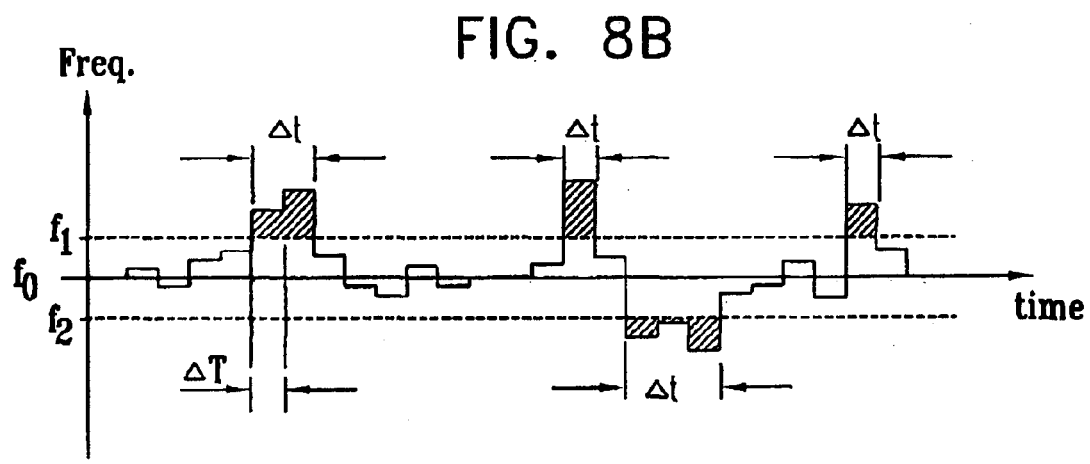

Turning to FIG. 8B, it is seen that the clock frequency f, which is a direct function of the pulse count over time duration $\Delta T$, varies up and down from a characteristic frequency $f_0$ over time. These variations may exceed predetermined thresholds $f_1$ and $f_2$. The time duration over which the clock frequency f exceeds either threshold is designated $\Delta t$.

Figure 8C:
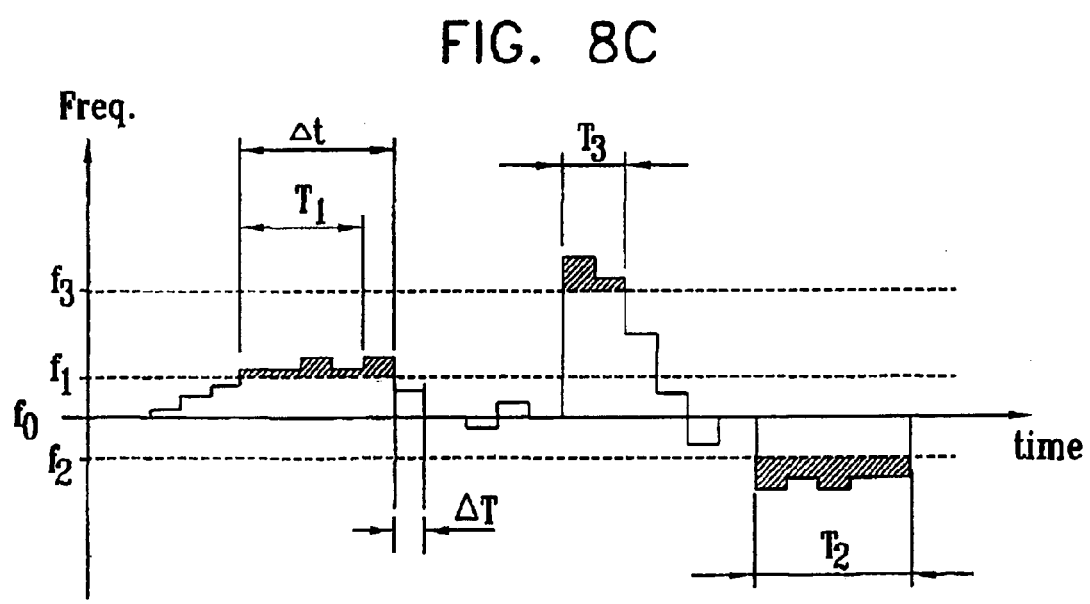

Referring now additionally to FIG. 8C, it is noted that depending on the programming of the microprocessor, an alarm indication may be provided each time that the clock frequency f exceeds either threshold. Alternatively, and preferably, an alarm indication is only provided when the clock frequency (Freq) exceeds either threshold for at least a predetermined time duration threshold $T_1$, such as when $\Delta t > T_1$. Alternatively or additionally, multiple frequency thresholds, in addition to thresholds $f_1$ and $f_2$, such as threshold $f_3$ may be defined and each may be associated with a different time duration threshold, such as $T_1$, $T_2$ and $T_3$, respectively. It is appreciated that the greater the separation of the threshold $f_n$ from the characteristic frequency $f_0$, the shorter is the corresponding time duration threshold $T_n$ thereof.

Figure 8D:
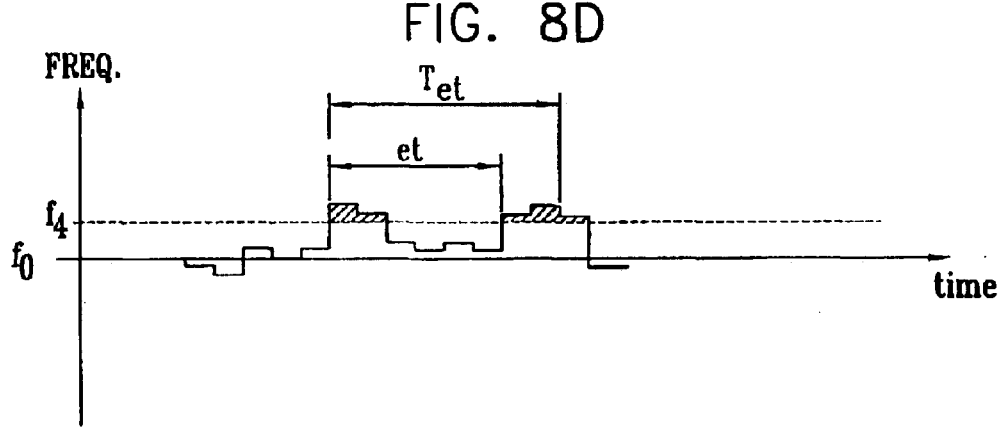

Reference is now made to FIG. 8D, which illustrates one manner in which the past history of frequency variation is taken into account in accordance with a preferred embodiment of the present invention. Here, the elapsed time et between exceedences of a given threshold, such as $f_4$ is measured and compared with an elapsed time threshold $T_{et}$. If the elapsed time et between exceedences of a given threshold is less than the corresponding elapsed time threshold $T_{et}$, an alarm indication may be provided. Otherwise, in this embodiment, an alarm indication is not normally provided. It is appreciated that the functionalities of FIGS. 8B, 8C and 8D may, of course, be combined in various ways.

Figure 8E:
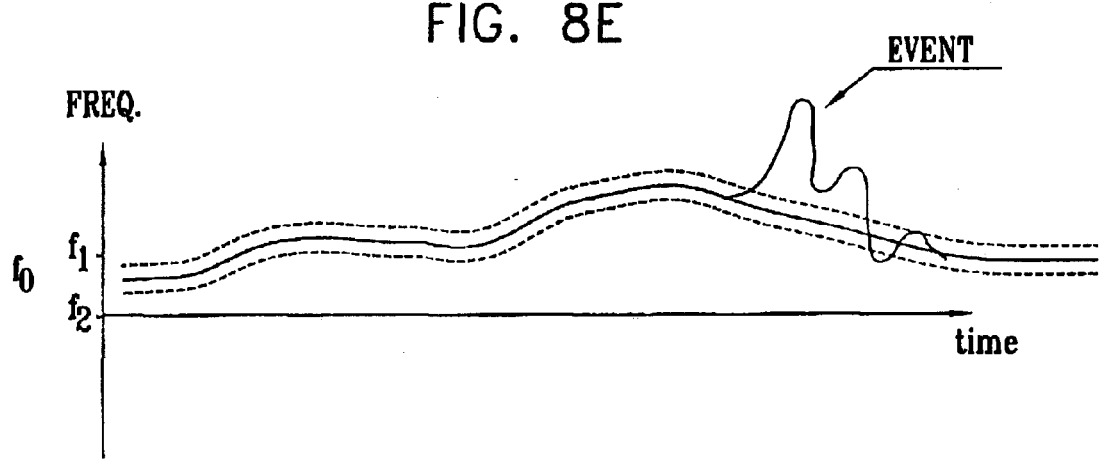

Reference is now made to FIG. 8E, which illustrates the fact that the characteristic frequency $f_0$. may vary slowly in time and that the various thresholds, such as $f_1$ and $f_2$ may vary accordingly. However, an event frequency change may vary rapidly. It is appreciated that this functionality may, of course, be combined with that of FIGS. 8B, 8C and 8D.

Figure 8F:

Referring now to FIG. 8F, it is appreciated that the duty cycle DS of the occurrence of time durations $\Delta T$ during which the pulse counts are taken may also vary as a function of past history, such that when variations in the clock frequency meeting given criteria are detected, pulse counts are taken more often. This enables the circuitry of FIGS. 6A and 6B to be operated in a sleep mode for energy savings, particularly when powered by batteries. It is also appreciated that this functionality may, of course, be combined with that of FIGS. 8B, 8C, 8D and 8E.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

What is claimed is:

1. A protected object comprising:
    an object having associated therewith a displacement sensing system including:
    an oscillator circuit having a characteristic frequency which varies as a function of a magnetic field in the vicinity thereof;
    an element whose position relative to said oscillator circuit is varied by a displacement to be sensed, said element being operative to vary the magnetic field in the vicinity of said oscillator circuit as a function of said displacement; and
    circuitry for sensing a change of frequency of said oscillator circuit over time ($\Delta f/\Delta t$) and for providing an output indication when the change in frequency of said oscillator circuit over time exceeds a threshold; and
    a locator operative for determining the location of at least one of said oscillator circuit, said element and said circuitry for sensing, wherein
    one but not both of said oscillator circuit and said element is fixedly mounted onto said object.

2. A protected object according to claim 1 and wherein said oscillator circuit is fixedly mounted onto said object.

3. A protected object according to claim 2 and wherein said threshold varies as a function of a currently perceived threat.

4. A protected object according to claim 1 and wherein said element is fixedly mounted onto said object.

5. A protected object according to claim 4 and wherein said currently perceived threat is determined by a pattern of past outputs of said circuitry for sensing a change of frequency.

6. A protected object according to claim 1 and wherein said threshold is variable.

7. A protected object according to claim 1 and wherein said oscillator circuit and said circuitry for sensing a change of frequency are operated in accordance with a duty cycle.

8. A protected object according to claim 7 and wherein said duty cycle is variable.

9. A protected object according to claim 8 and wherein said duty cycle is adaptive.

10. A protected object according to claim 8 and wherein said duty cycle varies as a function of a currently perceived threat.

11. A protected object according to claim 10 and wherein said currently perceived threat is determined by a pattern of past outputs of said circuitry for sensing a change of frequency.

12. A protected object according to claim 1 and wherein said threshold varies in accordance with long time scale changes in said characteristic frequency.

13. A protected object according to claim 1 and wherein said threshold comprises first and second frequency thresholds, respectively above and below said characteristic frequency and which are normally generally equally separated therefrom in the frequency domain.

14. A protected object according to claim 1 and wherein said circuitry for sensing a change of frequency over time provides at least first and second different output indications when said change in frequency of said oscillator circuit over time exceeds respective at least first and second different thresholds.

15. A protected object according to claim 1 and also comprising wireless communication circuitry operative to transmit said output indication to a remote receiving location.

16. A protected object according to claim 15 and wherein said wireless communication circuitry is operative to transmit said output indication for at least a predetermined time following sensing of said change in frequency.

17. A protected object according to claim 1 and wherein said element is a magnet.

18. A protected object according to claim 17 and wherein said element is an electromagnet.

19. A protected object according to claim 17 and wherein said element is a permanent magnet.

20. A protected object according to claim 1 and wherein said circuitry for sensing a change of frequency comprises a microprocessor which receives an output of said oscillator circuit as a clock input.

21. A protected object according to claim 1 and wherein said circuitry for sensing a change of frequency is operative to count oscillator pulses over variable time periods which represent variable sensitivity thresholds.

22. A protected object according to claim 1 and wherein said circuitry for sensing a change of frequency comprises a microprocessor which provides said output indication.

23. A protected object according to claim 1 and wherein said protected object is an art object.

24. A protected object according to claim 23 and wherein said art object is a painting and wherein one but not both of said oscillator circuit and said element is fixedly mounted onto a frame of said painting.

25. A protected object according to claim 23 and wherein said art object is a painting and wherein one but not both of said oscillator circuit and said element is fixedly mounted onto a canvas of said painting.

26. A protected object according to claim 1 and also comprising wireless communication circuitry operative to transmit said output indication to a remote receiving location.

27. A protected object according to claim 26 and wherein said wireless communication circuitry is operative to transmit said output indication for at least a predetermined time following sensing of said change in frequency.

28. Apparatus according to claim 1 and wherein said displacement is a vibrational displacement.

29. Apparatus according to claim 1 and wherein said oscillator circuit and said element are physically attached to each other.

30. Apparatus according to claim 1 and wherein said oscillator circuit and said element are not physically attached to each other.

31. A displacement sensing system comprising:
an oscillator circuit having a characteristic frequency which varies as a function of a magnetic field in the vicinity thereof;
an element whose position relative to said oscillator circuit is varied by a displacement to be sensed, said element being operative to vary the magnetic field in the vicinity of said oscillator circuit as a function of said displacement; and
circuitry for sensing a change of frequency of said oscillator circuit over time ($\Delta f/\Delta t$) and for providing an output indication when the change in frequency of said oscillator circuit over time exceeds a threshold; and
a locator operative for determining the location of at least one of said oscillator circuit, said element and said circuitry for sensing.

32. A displacement sensing system according to claim 31 and wherein said circuitry for sensing a change of frequency over time provides at least first and second different output indications when said change in frequency of said oscillator circuit over time exceeds respective at least first and second different thresholds.

33. A displacement sensing system according to claim 32 and wherein said threshold is variable.

34. A displacement sensing system according to claim 31 and wherein said threshold is variable.

35. A displacement sensing system according to claim 31 and wherein said threshold varies as a function of a currently perceived threat.

36. A displacement sensing system according to claim 35 and wherein said currently perceived threat is determined by a pattern of past outputs of said circuitry for sensing a change of frequency.

37. A displacement sensing system according to claim 31 and wherein said oscillator circuit and said circuitry for sensing a change of frequency are operated in accordance with a duty cycle.

38. A displacement sensing system according to claim 37 and wherein said duty cycle is variable.

39. A displacement sensing system according to claim 38 and wherein said duty cycle is adaptive.

40. A displacement sensing system according to claim 38 and wherein said duty cycle varies as a function of a currently perceived threat.

41. A displacement sensing system according to claim 40 and wherein said currently perceived threat is determined by a pattern of past outputs of said circuitry for sensing a change of frequency.

42. A displacement sensing system according to claim 31 and wherein said threshold varies in accordance with long time scale changes in said characteristic frequency.

43. A displacement sensing system according to claim 31 and wherein said threshold comprises first and second frequency thresholds, respectively above and below said characteristic frequency and which are normally generally equally separated therefrom in the frequency domain.

44. A displacement sensing system according to claim 31 and also comprising wireless communication circuitry operative to transmit said output indication to a remote receiving location.

45. A displacement sensing system according to claim 44 and wherein said wireless communication circuitry is operative to transmit said output indication for at least a predetermined time following sensing of said change in frequency.

46. A displacement sensing system according to claim 31 and wherein said element is a magnet.

47. A displacement sensing system according to claim 46 and wherein said element is an electromagnet.

48. A displacement sensing system according to claim 46 and wherein said element is a permanent magnet.

49. A displacement sensing system according to claim 31 and wherein said circuitry for sensing a change of frequency comprises a microprocessor which receives an output of said oscillator circuit as a clock input.

50. A displacement sensing system according to claim 31 and wherein said circuitry for sensing a change of frequency is operative to count oscillator pulses over variable time periods which represent variable sensitivity thresholds.

51. Apparatus according to claim 31 and wherein said displacement is a vibrational displacement.

52. Apparatus according to claim 31 and wherein said oscillator circuit and said element are physically attached to each other.

53. Apparatus according to claim 31 and wherein said oscillator circuit and said element are not physically attached to each other.

54. A displacement sensing system comprising:
an oscillator circuit having a characteristic frequency which varies as a function of a magnetic field in the vicinity thereof;
an element whose position relative to said oscillator circuit is varied by a displacement to be sensed, said element being operative to vary the magnetic field in the vicinity of said oscillator circuit as a function of said displacement; and
circuitry for sensing a time duration over which a change of frequency of at least a given amount takes place and for providing an output indication when said time duration exceeds a threshold; and
a locator operative for determining the location of at least one of said oscillator circuit, said element and said circuitry for sensing.

55. A displacement sensing system according to claim 54 and wherein said circuitry for sensing a time duration provides at least first and second different output indications when said time duration exceeds respective at least first and second different thresholds.

56. A displacement sensing system according to claim 55 and wherein said threshold is variable.

57. A displacement sensing system according to claim 54 and wherein said threshold is variable.

58. A displacement sensing system according to claim 54 and wherein said threshold varies as a function of a currently perceived threat.

59. A displacement sensing system according to claim 58 and wherein said currently perceived threat is determined by a pattern of past outputs of said circuitry for sensing a time duration.

60. A displacement sensing system according to claim 54 and wherein said oscillator circuit and said circuitry for sensing a time duration are operated in accordance with a duty cycle.

61. A displacement sensing system according to claim 60 and wherein said duty cycle is variable.

62. A displacement sensing system according to claim 61 and wherein said duty cycle is adaptive.

63. A displacement sensing system according to claim 61 and wherein said duty cycle varies as a function of a currently perceived threat.

64. A displacement sensing system according to claim 63 and wherein said currently perceived threat is determined by a pattern of past outputs of said circuitry for sensing a time duration.

65. A displacement sensing system according to claim 54 and wherein said given amount remains generally constant notwithstanding long time scale changes in said characteristic frequency.

66. A displacement sensing system according to claim 54 and also comprising wireless communication circuitry operative to transmit said output indication to a remote receiving location.

67. A displacement sensing system according to claim 66 and wherein said wireless communication circuitry is operative to transmit said output indication for at least a predetermined time following sensing of said time duration.

68. A displacement sensing system according to claim 54 and wherein said element is a magnet.

69. A displacement sensing system according to claim 68 and wherein said element is an electromagnet.

70. A displacement sensing system according to claim 68 and wherein said element is a permanent magnet.

71. A displacement sensing system according to claim 54 and wherein said circuitry for sensing a time duration comprises a microprocessor which receives an output of said oscillator circuit as a clock input.

72. A displacement sensing system according to claim 54 and wherein said circuitry for sensing a time duration is operative to count oscillator pulses over variable time periods which represent variable sensitivity thresholds.

73. A displacement sensing system according to claim 54 and wherein said circuitry for sensing a time duration comprises a microprocessor which provides said output indication.

74. Apparatus according to claim 54 and wherein said displacement is a vibrational displacement.

75. Apparatus according to claim 54 and wherein said oscillator circuit and said element are physically attached to each other.

76. Apparatus according to claim 54 and wherein said oscillator circuit and said element are not physically attached to each other.

77. A displacement sensing system comprising:
an oscillator circuit having a characteristic frequency which varies as a function of a magnetic field in the vicinity thereof;
an element whose position relative to said oscillator circuit is varied by a displacement to be sensed, said element being operative to vary the magnetic field in the vicinity of said oscillator circuit as a function of said displacement;
circuitry for sensing a change of frequency of said oscillator circuit over time ($\Delta f/\Delta t$) and for providing an output indication when the change in frequency of said oscillator circuit over time exceeds a frequency threshold; and
circuitry for sensing a time duration over which a change of frequency of at least a given amount takes place and for providing an output indication when said time duration exceeds a time threshold; and
a locator operative for determining the location of at least one of said oscillator circuit, said element and said circuitry for sensing.

78. A displacement sensing system according to claim 77 and wherein said circuitry for sensing a change of frequency over time provides at least first and second different output indications when said change in frequency of said oscillator circuit over time exceeds respective at least first and second different thresholds.

79. A displacement sensing system according to claim 78 and wherein said frequency threshold is variable.

80. A displacement sensing system according to claim 77 and wherein said frequency threshold is variable.

81. A displacement sensing system according to claim 80 and wherein said frequency threshold varies as a function of a currently perceived threat.

82. A displacement sensing system according to claim 81 and wherein said currently perceived threat is determined by a pattern of past outputs of said circuitry for sensing a change of frequency.

83. A displacement sensing system according to claim 77 and wherein said frequency threshold varies in accordance with long time scale changes in said characteristic frequency.

84. A displacement sensing system according to claim 77 and wherein said frequency threshold comprises first and second frequency thresholds, respectively above and below said characteristic frequency and which are normally generally equally separated therefrom in the frequency domain.

85. A displacement sensing system according to claim 77 and wherein said time threshold is variable.

86. A displacement sensing system according to claim 85 and wherein said time threshold varies as a function of a currently perceived threat.

87. A displacement sensing system according to claim 86 and wherein said currently perceived threat is determined by a pattern of past outputs of said circuitry for sensing a change of frequency.

88. A displacement sensing system according to claim 77 and wherein said oscillator circuit and said circuitry for sensing a time duration are operated in accordance with a duty cycle.

89. A displacement sensing system according to claim 88 and wherein said duty cycle is variable.

90. A displacement sensing system according to claim 89 and wherein said duty cycle varies as a function of a currently perceived threat.

91. A displacement sensing system according to claim 90 and wherein said currently perceived threat is determined by a pattern of past outputs of said circuitry for sensing a change of frequency.

92. A displacement sensing system according to claim 88 and wherein said duty cycle is adaptive.

93. A displacement sensing system according to claim 77 and wherein said given amount remains generally constant notwithstanding long time scale changes in said characteristic frequency.

94. A displacement sensing system according to claim 77 and wherein said circuitry for sensing a time duration provides at least first and second different output indications when said time duration exceeds respective at least first and second different thresholds.

95. A displacement sensing system according to claim 77 and also comprising wireless communication circuitry operative to transmit said output indication to a remote receiving location.

96. A displacement sensing system according to claim 95 and wherein said wireless communication circuitry is operative to transmit said output indication for at least a predetermined time following sensing of said change in frequency.

97. A displacement sensing system according to claim 77 and wherein said element is a magnet.

98. A displacement sensing system according to claim 97 and wherein said element is an electromagnet.

99. A displacement sensing system according to claim 97 and wherein said element is a permanent magnet.

100. A displacement sensing system according to claim 77 and wherein said circuitry for sensing a time duration and said circuitry for sensing a change of frequency comprises a microprocessor which receives an output of said oscillator circuit as a clock input.

101. A displacement sensing system according to claim 77 and wherein said circuitry for sensing a time duration is operative to count oscillator pulses over variable time periods which represent variable sensitivity thresholds.

102. Apparatus according to claim 77 and wherein said displacement is a vibrational displacement.

103. Apparatus according to claim 77 and wherein said oscillator circuit and said element are physically attached to each other.

104. Apparatus according to claim 77 and wherein said oscillator circuit and said element are not physically attached to each other.

105. A protected object comprising:
an object having associated therewith a displacement sensing system including:
an oscillator circuit having a characteristic frequency which varies as a function of a magnetic field in the vicinity thereof;
an element whose position relative to said oscillator circuit is varied by a displacement to be sensed, said element being operative to vary the magnetic field in the vicinity of said oscillator circuit as a function of said displacement; and
circuitry for sensing a time duration over which a change of frequency of at least a given amount takes place and for providing an output indication when said time duration exceeds a threshold; and
a locator operative for determining the location of at least one of said oscillator circuit, said element and said circuitry for sensing, wherein
one but not both of said oscillator circuit and said element is fixedly mounted onto said object.

106. A protected object according to claim 105 and wherein said oscillator circuit is fixedly mounted onto said object.

107. A protected object according to claim 105 and wherein said element is fixedly mounted onto said object.

108. A protected object according to claim 105 and wherein said threshold is variable.

109. A protected object according to claim 108 and wherein said threshold varies as a function of a currently perceived threat.

110. A protected object according to claim 109 and wherein said currently perceived threat is determined by a pattern of past outputs of said circuitry for sensing a time duration.

111. A protected object according to claim 105 and wherein said oscillator circuit and said circuitry for sensing a time duration are operated in accordance with a duty cycle.

112. A protected object according to claim 111 and wherein said duty cycle is variable.

113. A protected object according to claim 112 and wherein said duty cycle varies as a function of a currently perceived threat.

114. A protected object according to claim 113 and wherein said currently perceived threat is determined by a pattern of past outputs of said circuitry for sensing a time duration.

115. A protected object according to claim 111 and wherein said duty cycle is adaptive.

116. A protected object according to claim 105 and wherein said given amount remains generally constant notwithstanding long time scale changes in said characteristic frequency.

117. A protected object according to claim 105 and wherein said circuitry for sensing a time duration provides at least first and second different output indications when said time duration exceeds respective at least first and second different thresholds.

118. A protected object according to claim 105 and also comprising wireless communication circuitry operative to transmit said output indication to a remote receiving location.

119. A protected object according to claim 105 and wherein said wireless communication circuitry is operative to transmit said output indication for at least a predetermined time following sensing of said time duration.

120. A protected object according to claim 105 and wherein said element is a magnet.

121. A protected object according to claim 120 and wherein said element is an electromagnet.

122. A protected object according to claim 120 and wherein said element is a permanent magnet.

123. A protected object according to claim 105 and wherein said circuitry for sensing a time duration comprises a microprocessor which receives an output of said oscillator circuit as a clock input.

124. A protected object according to claim 105 and wherein said circuitry for sensing a time duration is operative to count oscillator pulses over variable time periods which represent variable sensitivity thresholds.

125. A protected object according to claim 105 and wherein said protected object is an art object.

126. A protected object according to claim 125 and wherein said art object is a painting and wherein one but not both of said oscillator circuit and said element is fixedly mounted onto a frame of said painting.

127. A protected object according to claim 125 and wherein said art object is a painting and wherein one but not both of said oscillator circuit and said element is fixedly mounted onto a canvas of said painting.

128. A protected object according to claim 105 and also comprising wireless communication circuitry operative to transmit said output indication to a remote receiving location.

129. A protected object according to claim 128 and wherein said wireless communication circuitry is operative to transmit said output indication for at least a predetermined time following sensing of said time duration.

130. Apparatus according to claim 105 and wherein said displacement is a vibrational displacement.

131. Apparatus according to claim 105 and wherein said oscillator circuit and said element are physically attached to each other.

132. Apparatus according to claim 105 and wherein said oscillator circuit and said element are not physically attached to each other.

133. A protected object comprising:
an object having associated therewith a displacement sensing system including:
an oscillator circuit having a characteristic frequency which varies as a function of a magnetic field in the vicinity thereof;
an element whose position relative to said oscillator circuit is varied by a displacement to be sensed, said element being operative to vary the magnetic field in the vicinity of said oscillator circuit as a function of said displacement;
circuitry for sensing a change of frequency of said oscillator circuit over time ($\Delta f/\Delta t$) and for providing an output indication when the change in frequency of said oscillator circuit over time exceeds a frequency threshold;
circuitry for sensing a time duration over which a change of frequency of at least a given amount takes place and for providing an output indication when said time duration exceeds a time threshold; and
a locator operative for determining the location of at least one of said oscillator circuit, said element and said circuitry for sensing, wherein
one but not both of said oscillator circuit and said element is fixedly mounted onto said object.

134. A protected object according to claim 133 and wherein said oscillator circuit is fixedly mounted onto said object.

135. A protected object according to claim 133 and wherein said element is fixedly mounted onto said object.

136. A protected object according to claim 133 and wherein said frequency threshold is variable.

137. A protected object according to claim 136 and wherein said frequency threshold varies as a function of a currently perceived threat.

138. A protected object according to claim 137 and wherein said currently perceived threat is determined by a pattern of past outputs of said circuitry for sensing a change of frequency.

139. A protected object according to claim 133 and wherein said oscillator circuit and said circuitry for sensing a change of frequency are operated in accordance with a duty cycle.

140. A protected object according to claim 139 and wherein said duty cycle is variable.

141. A protected object according to claim 140 and wherein said duty cycle varies as a function of a currently perceived threat.

142. A protected object according to claim 141 and wherein said currently perceived threat is determined by a pattern of past outputs of said circuitry for sensing a change of frequency.

143. A protected object according to claim 139 and wherein said duty cycle is adaptive.

144. A protected object according to claim 133 and wherein said frequency threshold varies in accordance with long time scale changes in said characteristic frequency.

145. A protected object according to claim 133 and wherein said frequency threshold comprises first and second frequency thresholds, respectively above and below said characteristic frequency and which are normally generally equally separated therefrom in the frequency domain.

146. A protected object according to claim 133 and wherein said circuitry for sensing a change of frequency over time provides at least first and second different output indications when said change in frequency of said oscillator circuit over time exceeds respective at least first and second different thresholds.

147. A protected object according to claim 133 and wherein said time threshold is variable.

148. A protected object according to claim 147 and wherein said time threshold varies as a function of a currently perceived threat.

149. A protected object according to claim 148 and wherein said currently perceived threat is determined by a pattern of past outputs of said circuitry for sensing a change of frequency.

150. A protected object according to claim 133 and wherein said oscillator circuit and said circuitry for sensing a time duration are operated in accordance with a duty cycle.

151. A protected object according to claim 150 and wherein said duty cycle is variable.

152. A protected object according to claim 151 and wherein said duty cycle varies as a function of a currently perceived threat.

153. A protected object according to claim 152 and wherein said currently perceived threat is determined by a pattern of past outputs of said circuitry for sensing a change of frequency.

154. A protected object according to claim 150 and wherein said duty cycle is adaptive.

155. A protected object according to claim 133 and wherein said given amount remains generally constant notwithstanding long time scale changes in said characteristic frequency.

156. A protected object according to claim 133 and wherein said circuitry for sensing a time duration provides at least first and second different output indications when said time duration exceeds respective at least first and second different thresholds.

157. A protected object according to claim 133 and wherein said element is a magnet.

158. A protected object according to claim 157 and wherein said element is an electromagnet.

159. A protected object according to claim 157 and wherein said element is a permanent magnet.

160. A protected object according to claim 133 and wherein said circuitry for sensing a change of frequency is a microprocessor which receives an output of said oscillator circuit as a clock input.

161. A protected object according to claim 133 and wherein said circuitry for sensing a change of frequency is operative to count oscillator pulses over variable time periods which represent variable sensitivity thresholds.

162. A protected object according to claim 133 and wherein said circuitry for sensing a change of frequency comprises a microprocessor which provides said output indication.

163. A protected object according to claim 133 and wherein said protected object is an art object.

164. A protected object according to claim 163 and wherein said art object is a painting and wherein one but not both of said oscillator circuit and said element is fixedly mounted onto a frame of said painting.

165. A protected object according to claim 163 and wherein said art object is a painting and wherein one but not both of said oscillator circuit and said element is fixedly mounted onto a canvas of said painting.

166. A protected object according to claim 133 and also comprising wireless communication circuitry operative to transmit said output indication to a remote receiving location.

167. A protected object according to claim 166 and wherein said wireless communication circuitry is operative to transmit said output indication for at least a predetermined time following sensing of said change in frequency.

168. Apparatus according to claim 133 and wherein said displacement is a vibrational displacement.

169. Apparatus according to claim 133 and wherein said oscillator circuit and said element are physically attached to each other.

170. Apparatus according to claim 133 and wherein said oscillator circuit and said element are not physically attached to each other.

171. A displacement sensing system comprising:

an oscillator circuit having a characteristic frequency which varies as a function of a magnetic field in the vicinity thereof;

an element whose position relative to said oscillator circuit is varied by a displacement to be sensed, said element being operative to vary the magnetic field in the vicinity of said oscillator circuit as a function of said displacement; and circuitry for sensing a change of frequency of said oscillator circuit over time ($\Delta f/\Delta t$) and for providing an output indication when the change in frequency of said oscillator circuit over time exceeds a threshold, wherein said threshold comprises first and second frequency thresholds, respectively above and below said characteristic frequency and which are normally generally equally separated therefrom in the frequency domain.

172. A displacement sensing system comprising:

an oscillator circuit having a characteristic frequency which varies as a function of a magnetic field in the vicinity thereof;

an element whose position relative to said oscillator circuit is varied by a displacement to be sensed, said element being operative to vary the magnetic field in the vicinity of said oscillator circuit as a function of said displacement; and circuitry for sensing a time duration over which a change of frequency of at least a given frequency threshold takes place and for providing an output indication when said time duration exceeds a time threshold, wherein said frequency threshold comprises first and second frequency thresholds, respectively above and below said characteristic frequency and which are normally generally equally separated therefrom in the frequency domain.

173. A displacement sensing system comprising:

an oscillator circuit having a characteristic frequency which varies as a function of a magnetic field in the vicinity thereof;

an element whose position relative to said oscillator circuit is varied by a displacement to be sensed, said element being operative to vary the magnetic field in the vicinity of said oscillator circuit as a function of said displacement;

circuitry for sensing a change of frequency of said oscillator circuit over time ($\Delta f/\Delta t$) and for providing an output indication when the change in frequency of said oscillator circuit over time exceeds a frequency threshold; and circuitry for sensing a time duration over which a change of frequency of at least a given amount takes place and for providing an output indication when said time duration exceeds a time threshold, wherein said frequency threshold comprises first and second frequency thresholds, respectively above and below said characteristic frequency and which are normally generally equally separated therefrom in the frequency domain.

* * * * *